United States Patent [19]
Luecke et al.

[11] Patent Number: 5,816,986
[45] Date of Patent: Oct. 6, 1998

[54] UNIVERSAL CHUCK AND AUTOMATED MACHINING SYSTEM

[75] Inventors: Francis S. Luecke, Crestwood, Ky.; David F. Arnone, Mountain View; Kenneth W. Wallace, Saratoga, both of Calif.

[73] Assignee: New Focus, Inc., Santa Clara, Calif.

[21] Appl. No.: 777,055

[22] Filed: Dec. 30, 1996

[51] Int. Cl.⁶ .............................. B23Q 3/155; B23Q 3/06
[52] U.S. Cl. .............................................. 483/20; 269/297
[58] Field of Search ................................ 483/13, 54, 32, 483/20, 19; 29/56.6; 269/900, 297, 299, 304, 303, 315, 319

[56] References Cited

U.S. PATENT DOCUMENTS

| | | | |
|---|---|---|---|
| 2,415,259 | 2/1947 | Reuton | 769/109 |
| 4,298,195 | 11/1981 | McDougal | 269/304 |
| 4,647,027 | 3/1987 | Shafto | 409/219 X |
| 4,794,687 | 1/1989 | Peters et al. | 29/56.6 X |
| 4,928,939 | 5/1990 | Bell et al. | 409/219 X |

FOREIGN PATENT DOCUMENTS

| | | | |
|---|---|---|---|
| 2523492 | 9/1983 | France | 269/900 |
| 2408350 | 8/1975 | Germany | 269/900 |

*Primary Examiner*—William R. Briggs
*Attorney, Agent, or Firm*—Hugh D. Jaeger

[57] ABSTRACT

Universal chuck for holding of irregular or regular shaped parts for machine processing such as milling, shaping, grinding and the like. Movable and fixed platens have grid-like patterns including protrusions and spaces into which gripping jaw members, having a configured bottom surface, align and secure. A robotic tool provides for selection and transfer of jaw members from a jaw storage fixture and for securing of the jaw members to the movable and fixed platens.

6 Claims, 10 Drawing Sheets

Daily Operation Flow Chart:

Daily Operation Flow Chart:

In LabVIEW System:

UNIVERSAL CHUCK AND AUTOMATED MACHINING SYSTEM

BACKGROUND OF THE INVENTION

1. Field of the Invention

The present invention pertains to a machine tool chuck and, more particularly, relates to a chuck particularly adapted for use with a numerically controlled machine tool and having individual, positionable jaw elements, which are positioned and secured to fixed and movable platens by means of the numerically controlled machine tool, for the gripping of irregular or regular shaped parts for subsequent machining processes such as milling, grinding, shaping, drilling and the like by robotic or other means.

2. Description of the Prior Art

Prior art clamping or chucking devices often included a number of locations for attachment of clamping jaw members which were then used to hold a part to be machined. The prior art devices typically employed several clamping jaw members, each of which required manual positioning on the chuck or jig used to hold the part during machining. Since various parts have different shapes and sizes, it was common to use specialized jigs having dedicated holes or slots which accommodated positioning of each jaw member according to the shape, size and machining operation of each part. The use of dedicated jigs may require a large number of jigs for complex parts. If the positionable jaw members are fixed to a universal chuck or platen, having a large number of attachment locations, the setup time may become a burden. Locating and machining of a plane face chuck member to accept a plurality of one or more jaw members often provided to be time consuming and added further expense and effort spent in such fabrication. Such dedicated machining often rendered a chucking device unserviceable or unfit for subsequent jaw repositioning or usage.

The difficulty of holding the workpiece being machined, whether by a dedicated jig or the use of adjustable jaws on a universal chuck having positionable jaw members, is further compounded in the case of numerically controlled machine tools. Since the setup time requires the machine tool to be shut down while the jig is replaced or the adjustable jaws are repositioned, full use of the machine tool is inhibited. Clearly what is needed is a universal chuck device which is more efficient in terms of setup time and expense, is capable of being setup with conventional numerically controlled machine tools and robots, and which can accommodate a variety of regularly or irregularly shaped parts, thereby avoiding the necessity for a large number of dedicated jigs.

SUMMARY OF THE INVENTION

The present invention relates to a universal chuck, having a base, and a fixed platen and a positionable platen each having clamping jaws. The positionable platen is actuated, such as by robotics, for clamping in either direction along its translation axis. A jaw storage fixture is provided for storage of jaws which are robotically placed. The top surfaces of the platens are, but not necessarily, co-planar. The top platen surfaces are fitted with a grid-like pattern of alternating protrusions and spaces for positional accommodation and alignment of robotically placed and secured jaws which align to the grid-like pattern thus preventing movement of the jaws in plane. The jaws have mating features including configured bottom surfaces and robotically positionable retainer members which engage one of many tongue and groove-like slots in the upper region of a platen. Jaws are held down via spring force from a spring that stays with each jaw.

According to one embodiment of the present invention, there is provided a universal chuck having a base upon which is located a fixed platen and a positionable platen. The positionable platen includes track mount slots for mounting to and operating along tracks on the base member. Each platen includes a grid-like pattern at its upper surfaces. The grid-like patterns include protrusions extending from the upper platen surfaces having uniform spacing extending along the X and Y axes. Jaws align to the protrusions and uniform spaces of the grid-like surfaces of the platens and are secured thereto. A robotic tool aligns to the jaw for robotic placement and securement to the platen upper surface.

One significant aspect and feature of the present invention is a universal chuck having a fixed and a positionable platen suitably secured to a base member.

Another significant aspect and feature of the present invention is a grid-like pattern located on the upper surface of each platen.

Another significant aspect and feature of the present invention is a horizontally positionable platen which can be manually or robotically positioned.

Another significant aspect and feature of the present invention is the incorporation of uniformly spaced protrusions and uniformly spaced spaces along the X and Y axes along the top surface of the platens.

Another significant aspect and feature of the present invention is the use of slots used for anchoring in close proximity to the uniformly spaced protrusions and uniformly spaced spaces along the X and Y axes along the top surface of the platens.

Another significant aspect and feature of the present invention is a jaw which is robotically removed from a holding stall and placed and secured upon and to a platen as well as subsequent removal from a platen and return to the holding stall.

Another significant aspect and feature of the present invention is that the robotic tool attached to the jaw is grasped for transport instead of grasping the jaw itself.

Another significant aspect and feature of the present invention is a robotic tool which remains with the jaw during clamping and machining operations.

Another significant aspect and feature of the present invention is a jaw having suitable geometry to mate in a locking fashion with the grid-like pattern on the platen upper surface to prevent movement along the top planar surface of a platen.

Another significant aspect and feature of the present invention is a positionable cylindrical insert and connected retainer member in a jaw which are robotically actuated to secure the jaw to a platen by causing the retainer member to engage a slot in the upper region of the platen.

Another significant aspect and feature of the present invention is a jaw storage fixture for parking or storage of the jaws when not in use.

Another significant aspect and feature of the present invention is a software logic for preparation of the machining process and a software logic for daily operation of the machining process.

Having described one embodiment of the present invention, it is the principle objective hereof to provide a universal chuck and associated members, the present invention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
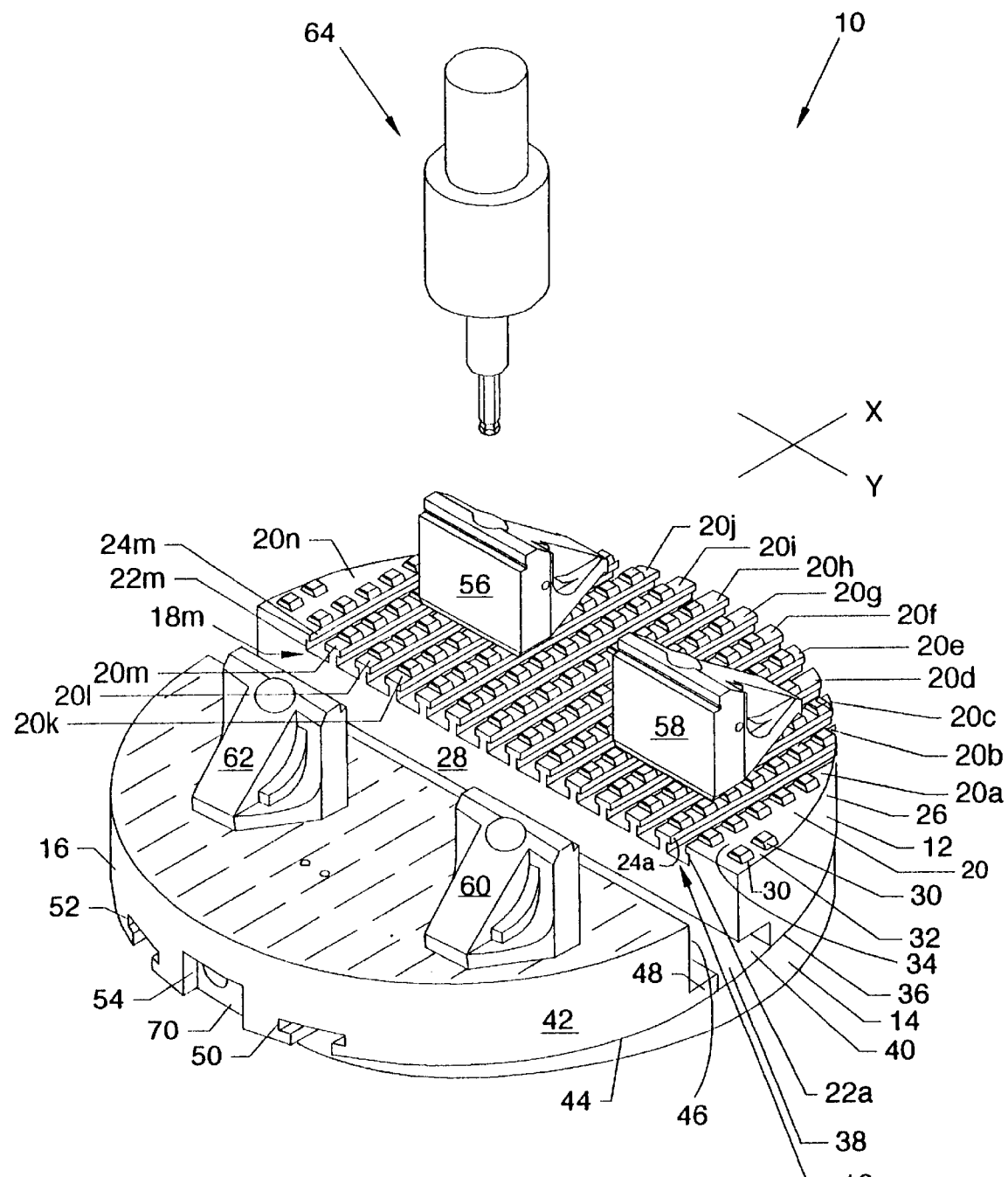
FIG. 1 illustrates a perspective view of a universal chuck 10.

FIG. 1 illustrates a perspective view of a universal chuck 10 for clamping and holding of regular or irregular shaped parts for machine processing such as by a milling machine or other such devices. The universal chuck 10 includes a semi-circular fixed platen 12 fixedly secured to a base 14 and a semi-circular positionable platen 16 slidably and adjustably secured to the base 14. In the fixed platen 12, a plurality of parallel slots 18a–18m, in the form of an inverted "T", interrupt the top planar surface 20 at regular intervals. The parallel slots 18a–18m include a plurality of large slot portions 22a–22m at the lower region of the slots 18a–18m and connecting plurality of smaller slots portions 24a–24m at the upper region of the slots 18a–18m. A plurality of planar regions 20a–20n, each being a division or portion of the top surface 20, are defined by the smaller slot portions 24a–24m, the arced side surface 26 of the fixed platen 12 and the vertical planar surface 28 of the fixed platen 12. Spaced at regular intervals along and about the planar regions 20a–20n are a plurality of similarly shaped truncated protrusions such as protrusion 30, extending upwardly from the planar regions 20a–20n. Between each similarly shaped truncated protrusion 30 along the X axis are uniform spaces 32 and between each similarly shaped truncated protrusion 30 along the Y axis are uniform spaces 34 being similar to the uniform space 32. A grid pattern of protrusions 30 and spaces 32 and/or 34 being of equal spacing with regard to and along and about the X and the Y axis is provided along the upper planar surface 20, or planar divisions thereof. Other geometrically configured protrusions, slots and the like are also considered within the scope of the invention and shall not be construed to be limiting to the scope of the invention. The bottom surface 36 of the fixed platen 12 mates to the upper surface 38 of the base 14. A cutout 40 is also located at the projected intersection of vertical surface 28 and the planar bottom surface 36 of the fixed platen 12. The positionable platen 16, substantially having a mirror-like upper region corresponding to the upper region of the fixed platen 12, includes a similar arrangement of spaced slots, surface protrusions and the like which are not illustrated for the purpose of brevity and clarity. The positionable platen 16 includes an arced side surface 42, a bottom surface 44 which slidably engages the upper surface 38 of the base 14, a planar vertical surface 46 corresponding to planar vertical surface 28, a lip 48 extending horizontally from the planar vertical surface 46, track slots 50 and 52 extending inwardly from the arced side surface 42, and a slot 54 extending inwardly from the arced side surface 42. A plurality of jaws, including jaws 56, 58, 60 and 62, each having a bottom surface geometry which mates and aligns to the protrusions 30 and spaces 32 and 34 at the platen top surfaces, such as top surface 20, are placed and secured thereto by a robotic tool 64, described later in detail. The bottom surface geometry is described in FIGS. 3 and 4.

Figure 2:
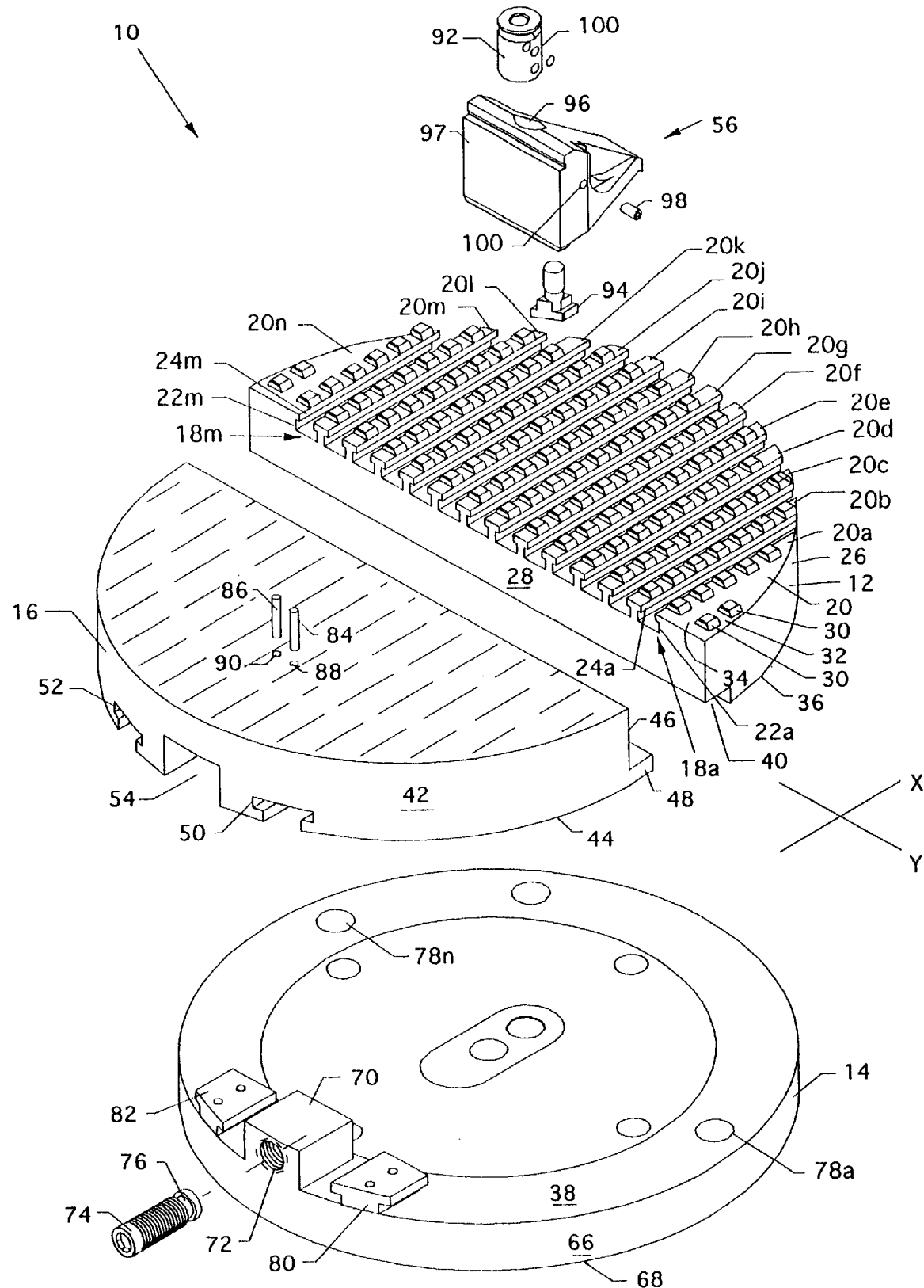
FIG. 2 illustrates an exploded view, in perspective, of the universal chuck 10.

FIG. 2 illustrates an exploded view, in perspective, of the universal chuck 10, where all numerals correspond to those elements previously described. Base 14 includes, in addition to the planar upper surface 38, an arced side surface 66, a planar bottom surface 68, a housing 70 extending upwardly from the planar upper surface 38 and adjacent to the arced side surface 66, a threaded hole 72 in the housing 70, an adjustment screw 74 having an annular groove 76 which aligns within hole 72 in housing 70, a plurality of securement holes 78a–78n extending vertically through the base 14, and, track mounts 80 and 82 secured to upper planar surface 38 in proximity to the housing 70. As previously described, the fixed platen 12 is fixedly secured to the upper surface 38. The bottom surface 44 of the positionable platen 16 slidably engages the upper planar surface 38 of the base 14 and is guided by engagement of the track mounts slots 50 and 52 with respect to track mounts 80 and 82 secured to the base 14. It is noted that housing 70 aligns in slot 54 of the positionable platen 16, as shown in FIG. 1, and that adjustment screw 74 extends through and beyond the threaded hole 72. The annular groove 76 on the adjustment screw 74 aligns between and is captured by pins 84 and 86 extending through holes 88 and 90 and respective hole extensions, respectively, in the positionable platen 16 thus adjustably linking the positionable platen 16 to the base 14. Adjustment screw 74 is rotated to position the positionable platen 16 along the X axis and along the base 14 toward or from the fixed platen 12 thus positioning jaw sets 56 and 58 and jaw sets 60 and 62, respectively. The adjustment screw 74 can be robotically actuated such as by a robotic tool similar to robotic tool 64 or can be manually actuated such as by a suitable wrench.

Jaw 56, typical of jaws 58, 60 and 62, is exploded to reveal a cylindrical insert 92 and a retainer member 94 resembling an inverted "T". Both the retainer member 94 and the cylindrical insert 92 align in a vertically aligned hole 96 in the main body 97 of the jaw 56 as later described in detail. A machine screw 98 aligns in a horizontally aligned hole 100 in the main body 97 of the jaw 56 to secure the cylindrical insert 92 in hole 96.

Figure 3:
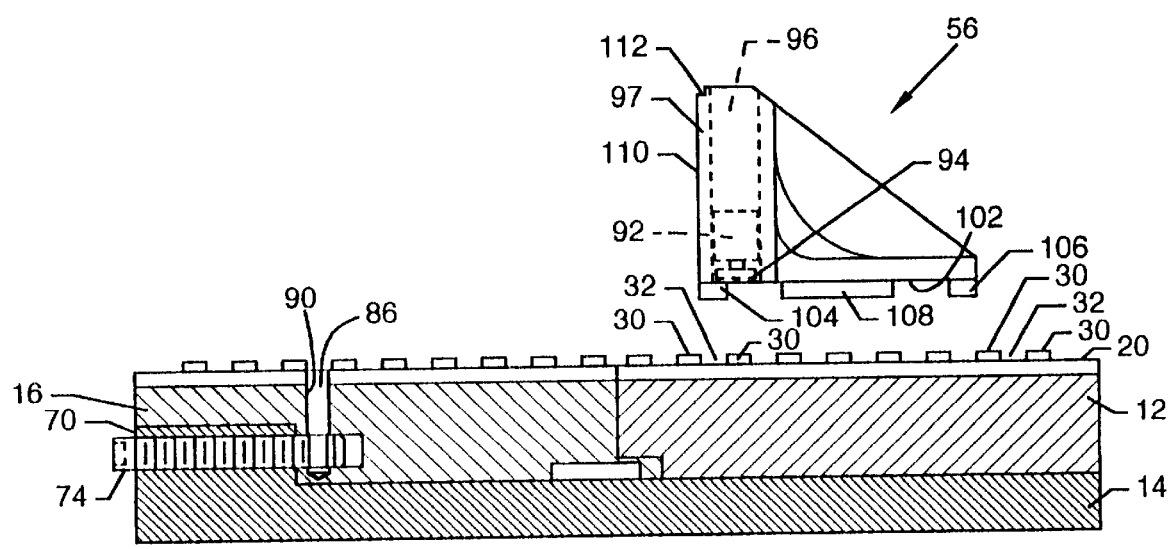
FIG. 3 illustrates a cross sectional view of the assembled universal chuck 10.
Figure 4:
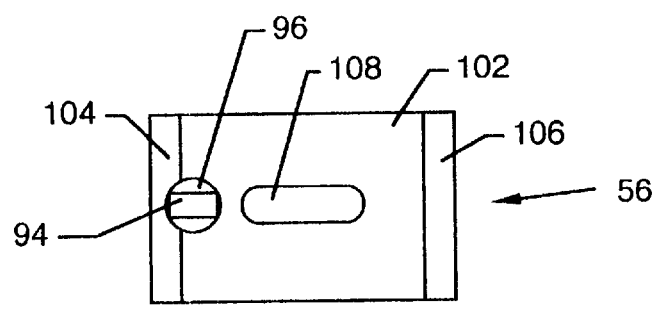
FIG. 4 illustrates a bottom view of the jaw.

FIG. 3 illustrates a cross sectional view of the assembled universal chuck 10 including base 14, fixed platen 12 and the positionable platen 16 and a side view of jaw 56, and FIG. 4 illustrates a bottom view of the jaw 56; where all numerals correspond to those elements previously described. With reference to FIGS. 3 and 4, it can be seen that the jaw 56 includes a plurality of elongated protrusions 104, 106 and 108 extending from the bottom surface 102 of the jaw 56 which align in the grid-like plurality of like spaces 32 and 34 between like protrusions 30 at the upper surface 20 of the fixed and positionable platens 12 and 16, respectively. Elongated protrusions 104 and 106 extend laterally across the bottom surface 102 and elongated protrusion 108 extends longitudinally across the bottom surface 102 of the jaw 56. During robotic placement, the jaw may be rotated to align at 90° increments with respect to the upper surface 20 of the fixed platen 12 or the corresponding surface of the positionable platen 16. Although a grid-like arrangement of protrusions and spaces oriented at right angles at the upper surface 20 is illustrated, it is appreciated that other orientations, such as 30°, 45° or other suitable incremental orientations or other shape protrusions, may be incorporated into the upper surface area 20. Jaw 56 also includes a vertical surface 110 along one side of the main body 97 and a cutout 112 at the upper edge of the surface 110. Vertical surface 110 may be suitably contoured, faced or otherwise suitably constructed to provide for a gripping surface which intimately contacts a regular or irregular shaped part. The vertical surface 110 may be made of either the parts parent material, most likely steel, or may be a separate insert optimized for frictional gripping or made soft to mar(?) the parts surface.

Figure 5:
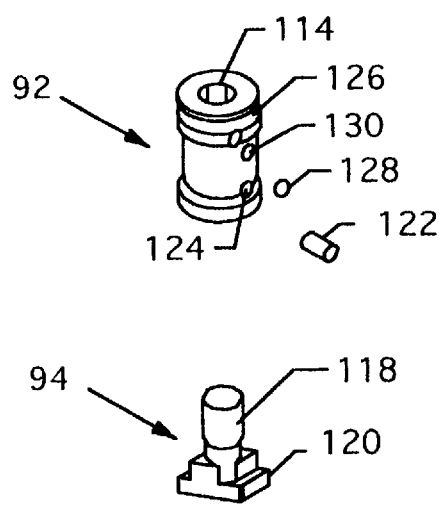
FIG. 5 illustrates an exploded view of the cylindrical insert.

FIG. 5 illustrates an exploded view of the cylindrical insert 92 and the retainer member 94, where all numerals correspond to those elements previously described. With reference to this FIG. 5 and to FIG. 7, the cylindrical insert 92 and retainer member 94 are now described. The cylindrical insert 92 includes a hexagonally-shaped interior 114 which accommodates a ball-end hexagonal wrench 116 of the robotic tool 64 and the upper end 118 of the retainer member 94. A rectangular member 120 is located at the lower end of the retainer member 94. A set screw 122 aligns in hole 124 in the wall of the retainer member 92 to secure the upper end 118 of the retainer member 94 in the hexagonally-shaped interior 114 of the cylindrical insert 92. Also, an annular groove 126 is located at the upper periphery of the cylindrical insert 92. Set screw 98 aligns in hole 100 of the jaw 56 and also in the annular groove 126 to provide for rotational securement of the cylindrical inert 92. A ball 128 is retained in an undersize hole 130 by a spring 132. Ball 128 provides for flexible capture of the ball end of the ball end hexagonal wrench 116.

Figure 6:
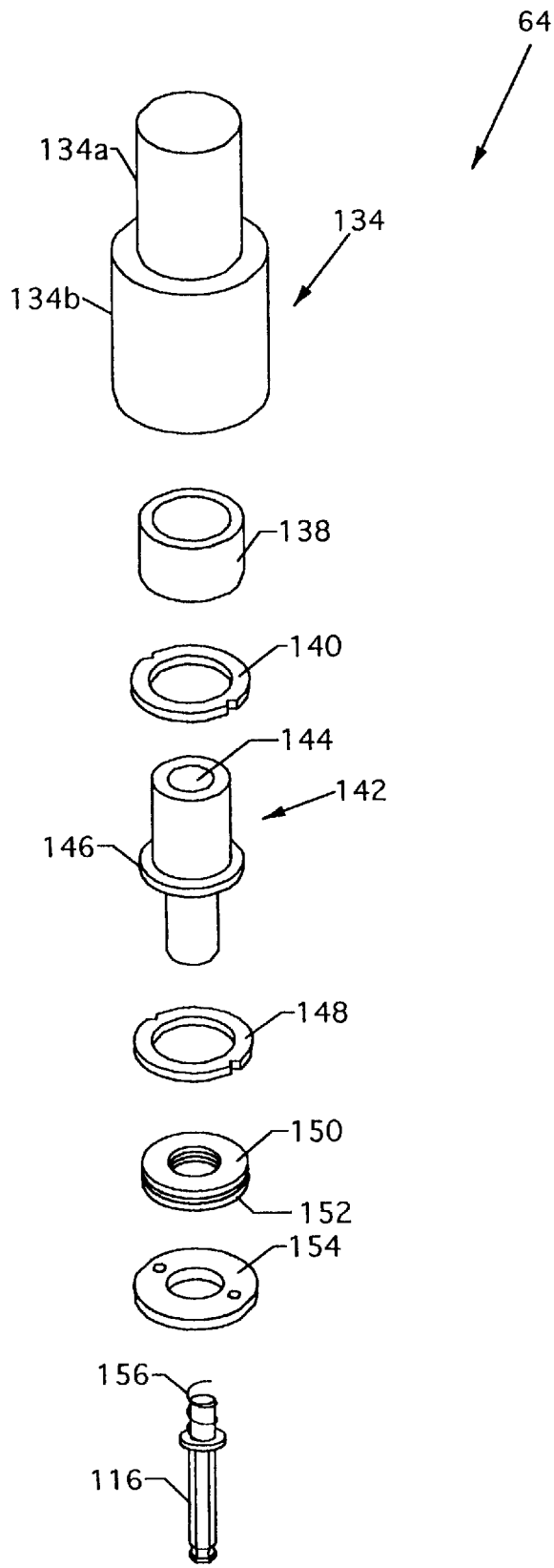
FIG. 6 illustrates an exploded view of the robotic tool 64.

FIG. 6 illustrates an exploded view of the robotic tool 64, where all numerals correspond to those elements previously described. With reference to this FIG. 6 and to FIG. 7, the robotic tool 64 is now described. The robotic tool 64 has a plurality of aligned members including a housing 134 having outer cylindrical surfaces 134a and 134b and a multi-radiused interior 136, a one way clutch 138, a clutch plate 140, a hexagonal wrench holder 142 having an interior bore 144 and a shoulder 146, a clutch plate 148, Belleville springs 150 and 152, plug 154, and a spring 156 aligned over and about the upper portion of the ball end hexagonal wrench 116.

Figure 7:
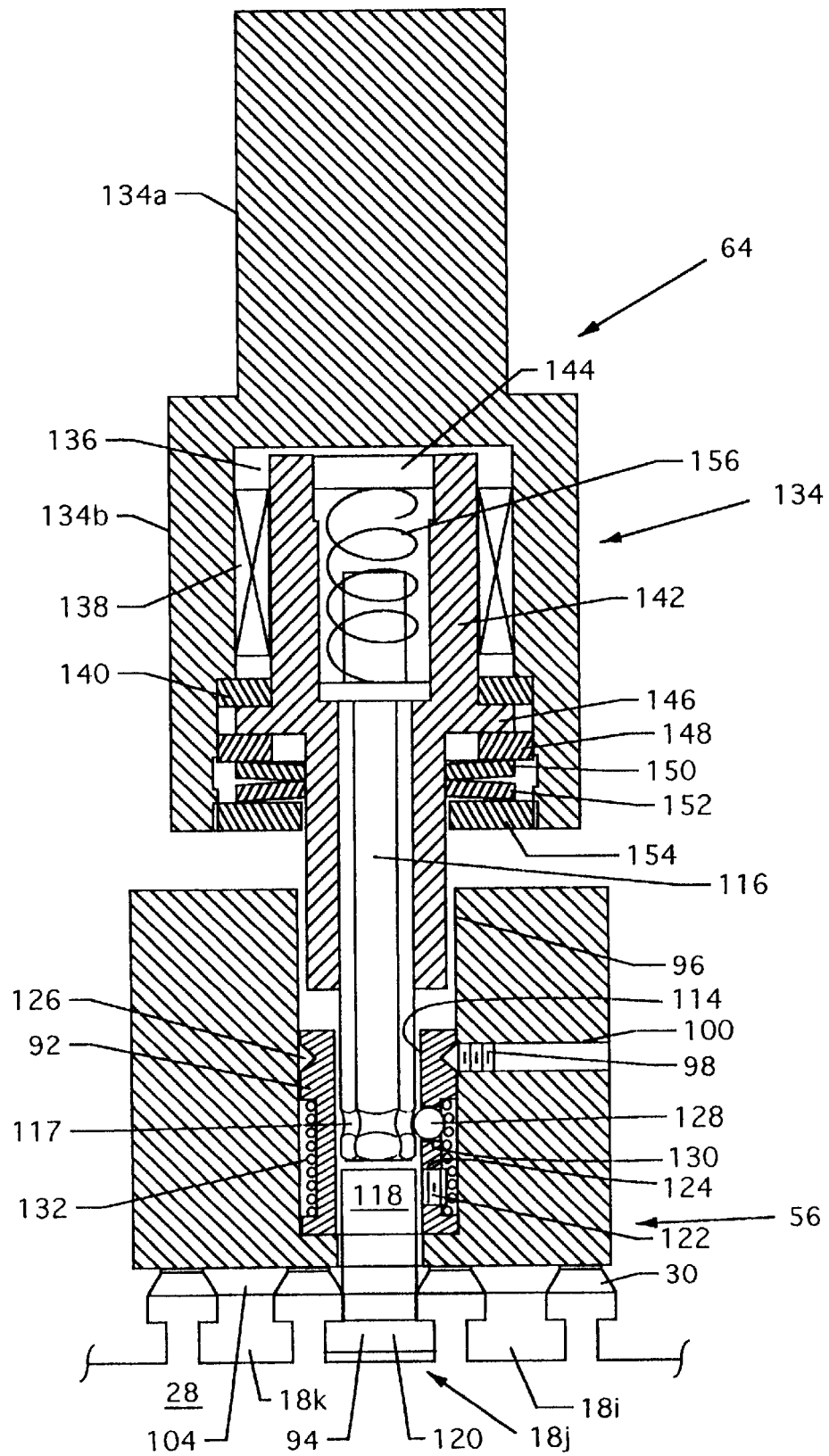
FIG. 7 illustrates a cross sectional view of the robotic tool engaging the components of a jaw.

FIG. 7 illustrates a cross sectional view of the robotic tool 64 engaging the components of a jaw 56, where all numerals correspond to those elements previously described. The robotic tool 64 rotates the cylindrical insert 92 and the retainer member 94 to cause the rectangular member 120 to engage a slot member, such as slot 18j, to secure the jaw 56 against the grid-like pattern at the upper surface 20 of the platens. Belleville washers 150 and 152 grip the shoulder 146 of the hexagonal wrench holder 142 and are sized to limit the applied torque delivered by the ball end hex wrench 116 to the cylindrical insert 92 and to the retainer member 94. One-way clutch 138 allows for positive rotation of the ball end hex wrench 116 in the opposite direction and thus the reversing of the cylindrical insert 92 and the retainer member 94 for removal or subsequent re-orientation of the jaw 56 from or to the platens 12 and 16. The robotic tool 64 remains with a jaw subsequent to placement and securement of a jaw by the holding action of the spring 128 which forces the ball 128 against a groove 117 at the bottom of the ball end hexagonal wrench 116. The ball end hexagonal wrench 116 easily overcomes the force of the spring 132 applied to the ball 128 for disengagement of the robotic tool 64 from the chuck 56. In the alternative, a screw can be incorporated to secure a jaw to the platens in lieu of robotic means if required or desired.

Figure 8:
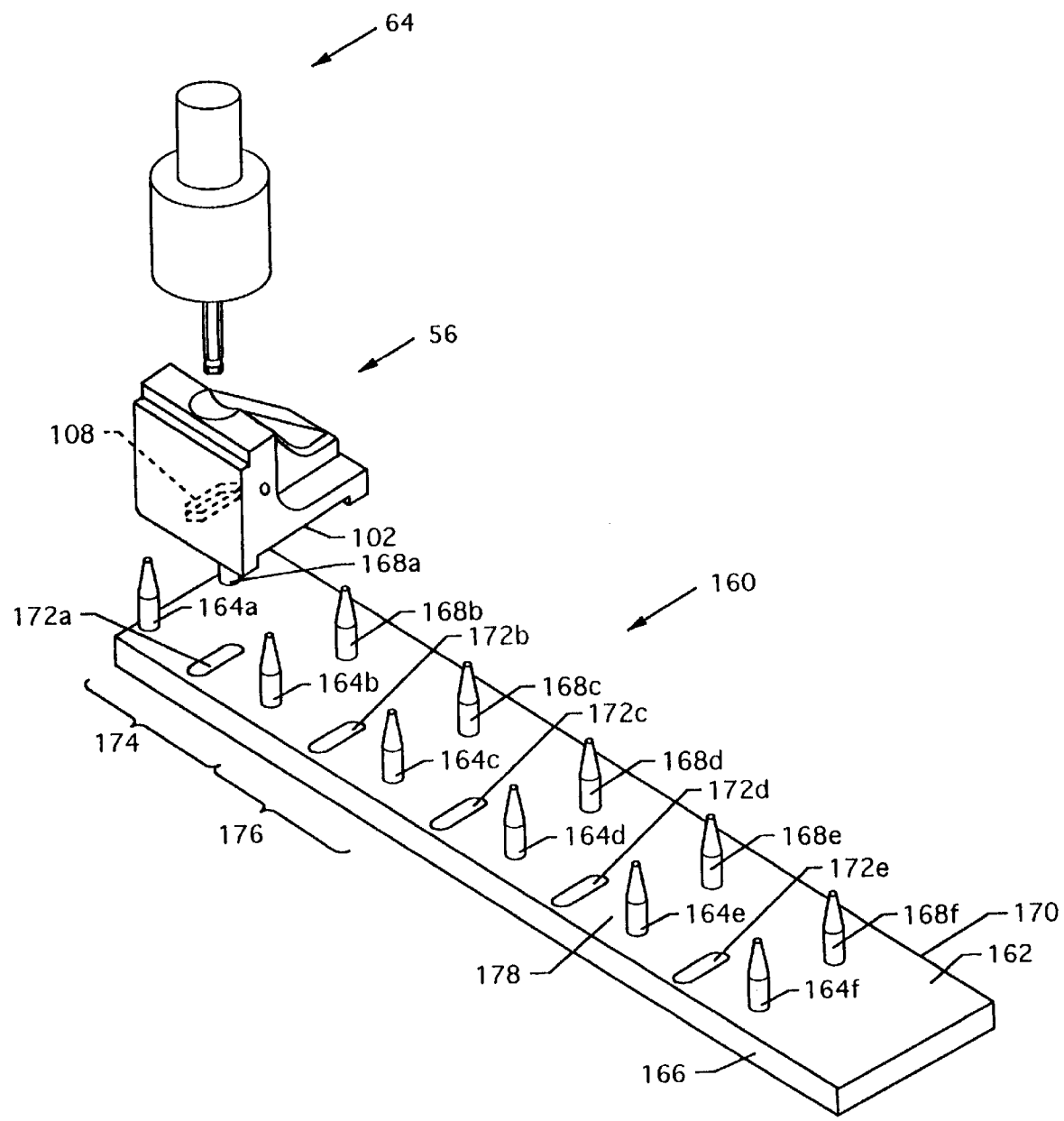
FIG. 8 illustrates an isometric view of a jaw storage fixture.

FIG. 8 illustrates an isometric view of a jaw storage fixture 160 for storage of one or more jaws, such as jaw 56, where all numerals correspond to those elements previously described. The jaw storage fixture 160 includes a planar base member 162 having a plurality of aligned tapered pins secured in holes in the planar base member 162. A plurality of tapered pins 164a–164f align near the front edge 166 of the planar base member 162, and, correspondingly, a plurality of tapered pins 168a–168f align near the rear edge 170 in alignment with the plurality of tapered pins 164a–164f. A plurality of elongated slots 172a–172e align in the planar base member 162 near the front edge 166 and between the tapered pins 164a–164f, as illustrated. A parking space 174 for jaw 56 is formed by tapered pins 164a, 164b, 168a and 168b and elongated slot 172a. In a like fashion, an adjacent parking space 176 is formed by tapered pins 164b, 164c, 168b, 168c and elongated slot 172b. Pins 164b and 168b are common to parking spaces 174 and 176 and such pin commonality is evident throughout the jaw storage fixture 160. Other adjacent parking spaces are formed in a similar fashion. The vertically aligned tapered pins 164a–164f and 168a–168f provide for vertical aligning contact with the planar sides of the jaws. The elongated protrusion 108 extending from the bottom surface 102 of each jaw engages one of the corresponding elongated slots 172a–172e to maintain the position of a jaw on the upper planar surface 178.

Figure 9:
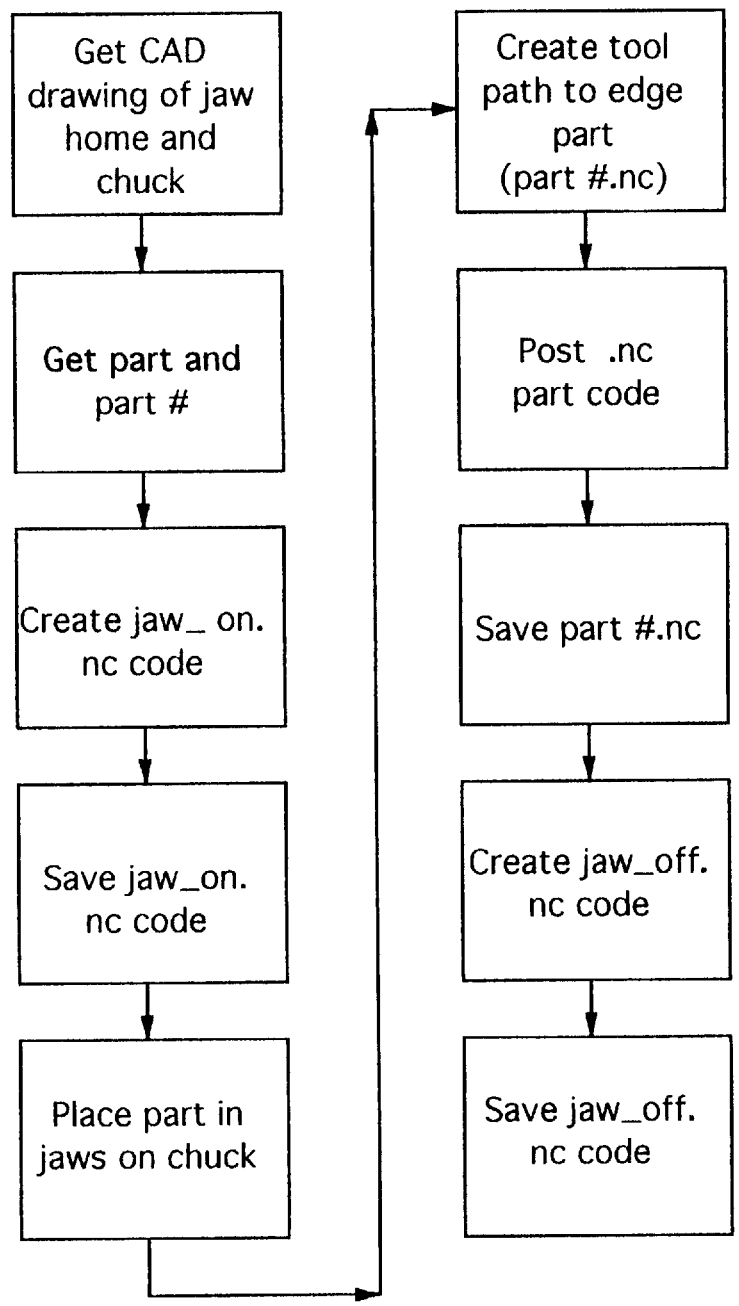
FIG. 9 illustrates a robotic preparation flow chart.

FIG. 9 illustrates a robotic preparation flow chart for initial setup incorporating a CAD/CAM system where part data is identified and placed.

Figure 10:
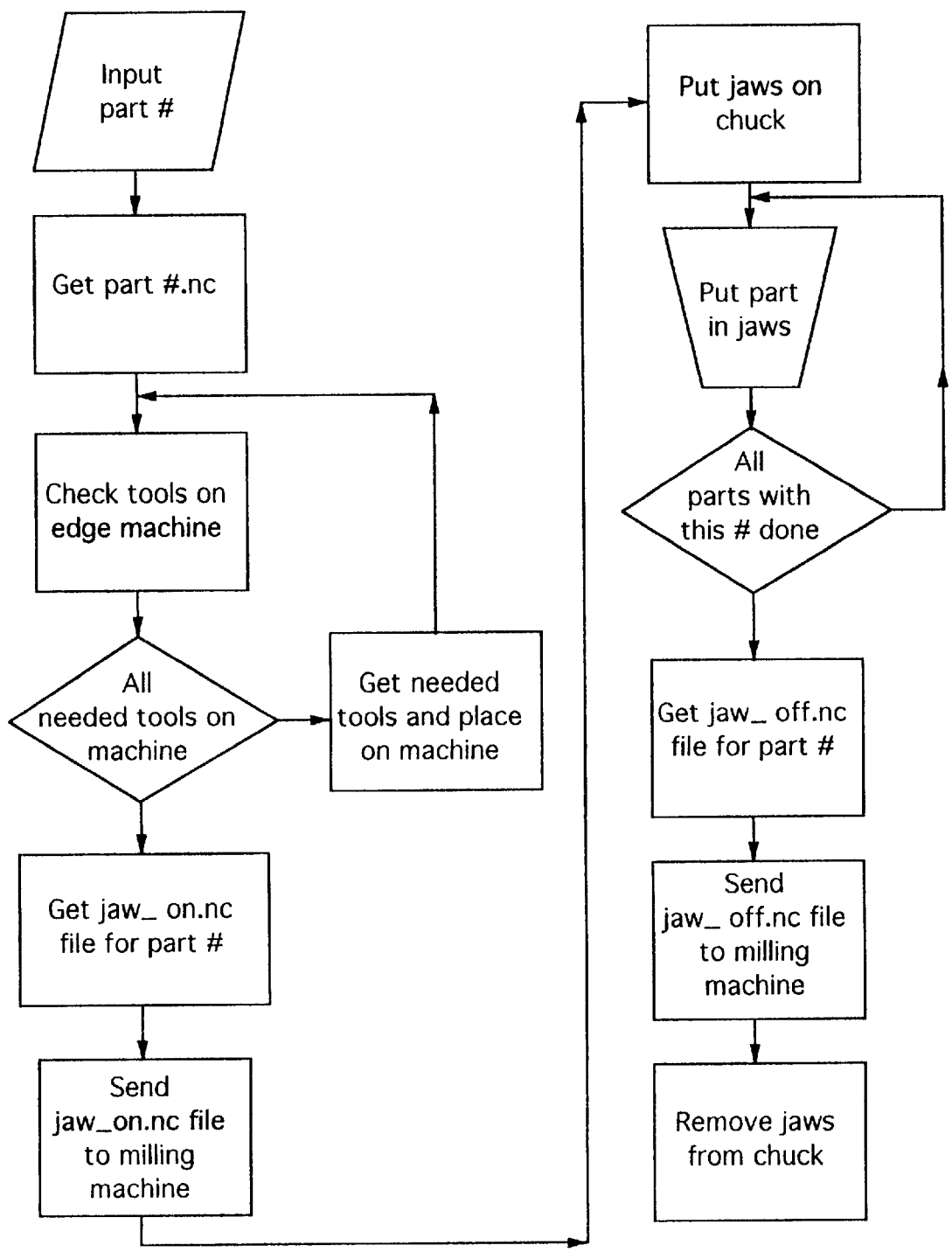
FIG. 10 illustrates a daily robotic operation flow chart.

FIG. 10 illustrates a daily robotic operation flow chart which outlines the operation of the LabVIEW system once the nc code for the part numbers have been imported into the LabVIEW system databases.

Various modifications can be made to the present invention without departing from the apparent scope hereof.

We claim:

1. In a chuck for holding and positioning a part to be operated on by a numerically controlled machine tool, the improvement comprising:

a. a positionable base member;

b. a first fixed platen mounted on said positionable base member;

c. said first platen having an upper surface;

d. a second moveable platen slidably mounted on said positionable base member to be moved toward and away from said fixed platen;

e. said second platen having an upper surface;

f. a plurality of symmetrically arranged surface protrusions on said upper surfaces of said first and second platens;

g. said surface protrusions having a generally square lower portion where they join said platens;

h. said surface protrusions having first vertical sidewall portions on the sides facing the opposite platen;

i. said surface protrusions having second inwardly-sloped sidewall portions on the sides away from said opposite platen;

j. said surface protrusions having third and fourth generally vertical sidewall portions; and, k. the spacing between said protrusions being adapted to fit removable jaw members which are clamped to said platens whereby the jaw members are located according to said vertical sidewall portions of said jaw members, said second wall portions accommodate misalignment during attachment of said jaw members to said platens.

2. In combination with the chuck according to claim 1:

a. a jaw member;

b. said jaw member having a first lower surface and a second clamping surface;

c. a first alignment protrusion positioned on said first jaw member surface adjacent the end of said jaw member closest to said clamping surface and adapted to fit into said spaces between said surface protrusions;

d. said first alignment protrusion having a vertical surface on an interior face of said protrusion;

e. a second alignment protrusion positioned on said first jaw member surface adjacent the end of said jaw member furthest from said clamping surface and adapted to fit into said spaces between said surface protrusions;

f. said second alignment protrusion having a sloped surface on an interior face of said protrusion to accommodate misalignment during the attachment of said jaw member to said platen; and, g. clamp means passing through a hole in said jaw member which places a portion of said first protrusion and engages said platen to hold said jaw member in a position determined by the location of the vertical surface of said first alignment protrusion and said clamping surface of said jaw member.

3. A jaw member according to claim 2, further including:

a. a third elongated protrusion on said first surface, extending in a direction perpendicular to said first and second jaw member protrusions; and, b. said third protrusion located to fit between said protrusions on said platens.

4. An automated machining system including a chuck according to claim 2, and a garage for said jaw members, comprising:

a. a garage base member mounted to be accessible to a tool-changing mechanism of said machine tool;

b. said jaw members having at least two holes extending upwardly from said first lower jaw surface;

c. a plurality of sets of index pins projecting upwardly from said garage base member and positioned to fit into said holes in said jaw members; and, d. said sets of index pins spaced apart accommodate the storage of a corresponding number of jaw members.

5. A system according to claim 4, wherein said index pins have a tapered end to facilitate positioning of said jaw members on said garage.

6. A system according to claim 3, wherein said garage base member includes a hole for said jaw member storage position located between said pins to accommodate said third alignment protrusion.

* * * * *